United States Patent
Chen et al.

(10) Patent No.: US 12,321,287 B1
(45) Date of Patent: Jun. 3, 2025

(54) INTERCONNECTS FOR PHYSICALLY UNCLONABLE FUNCTION AND METHOD OF ACHIEVING PHYSICALLY UNCLONABLE FUNCTION THROUGH INTERCONNECTS

(71) Applicant: UNITED MICROELECTRONICS CORP., Hsin-Chu (TW)

(72) Inventors: Chang-Yih Chen, Tainan (TW); Yi-Wen Chen, Chiayi County (TW); Chia-Chen Sun, Kaohsiung (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 41 days.

(21) Appl. No.: 18/404,794

(22) Filed: Jan. 4, 2024

(30) Foreign Application Priority Data

Nov. 28, 2023 (TW) .................................. 112145959

(51) Int. Cl.
*G06F 13/14* (2006.01)

(52) U.S. Cl.
CPC .......... *G06F 13/14* (2013.01); *G06F 2213/40* (2013.01)

(58) Field of Classification Search
None
See application file for complete search history.

(56) References Cited

U.S. PATENT DOCUMENTS

| 10,243,749 | B2 | 3/2019 | Park |
| 11,132,178 | B2 | 9/2021 | Plusquellic |
| 12,237,266 | B2 * | 2/2025 | Date .................. H01L 23/5286 |
| 2017/0373087 | A1 * | 12/2017 | Ito ......................... H10B 43/40 |
| 2018/0247005 | A1 * | 8/2018 | Sun ....................... G06F 30/392 |

OTHER PUBLICATIONS

Enamul Quadir, Md Shahed, "Physical Unclonable Functions for Authenticating and Preventing Reverse Engineering of Integrated Circuites and Electronics Hardware" (2020) Doctoral Dissertations. 2531. Available: https://opencommons.uconn.edu/dissertations/2531 (Year: 2020).*

* cited by examiner

*Primary Examiner* — Michael Sun
(74) *Attorney, Agent, or Firm* — Winston Hsu

(57) ABSTRACT

An interconnect for physically unclonable function (PUF), comprised of multiple arranged PUF cells. Each PUF cell includes at least two L-shaped metal line, wherein each L-shaped metal line includes a first part and a second part and is adjacent to a dummy metal line, and the first part of one L-shaped metal line is electrically connected to adjacent second part of another L-shaped metal line through via in vertical direction.

12 Claims, 6 Drawing Sheets

|   |   |   |   |   |   |
|---|---|---|---|---|---|
| 0 | 1 | 0 | 1 | 1 | 1 |
| 1 | 0 | 1 | 0 | 0 | 1 |
| 0 | 1 | 0 | 1 | 1 | 0 |
| 1 | 0 | 1 | 1 | 0 | 1 |

300

⋮

|   |   |   |   |   |   |
|---|---|---|---|---|---|
| 0 | 1 | 1 | 0 | 0 | 1 |
| 1 | 0 | 1 | 0 | 1 | 0 |
| 0 | 0 | 1 | 0 | 1 | 1 |
| 1 | 1 | 0 | 1 | 0 | 1 |

200

|   |   |   |   |   |   |
|---|---|---|---|---|---|
| 0 | 1 | 0 | 1 | 0 | 0 |
| 0 | 0 | 1 | 0 | 1 | 0 |
| 1 | 1 | 0 | 0 | 0 | 1 |
| 0 | 1 | 1 | 1 | 1 | 0 |

INTERCONNECTS FOR PHYSICALLY UNCLONABLE FUNCTION AND METHOD OF ACHIEVING PHYSICALLY UNCLONABLE FUNCTION THROUGH INTERCONNECTS

BACKGROUND OF THE INVENTION

1. Field of the Invention

The present invention relates generally to a semiconductor structure for physically unclonable function (PUF), and more specifically, to a semiconductor structure of achieving PUF through interconnects and method thereof.

2. Description of the Prior Art

Internet of things (IoT) technology installs sensors and software on various electronic equipment, so that they may be connected with each other for data transmission, and various aspects and interactive information of real world may therefore be digitalized to collect integrate digital information between things, which is a foundation for industrial intellectualization and has very wide application, such as transportation logistics, commercial manufacture, health care, intelligent environment (family, office or factory), personal field and social field.

Nevertheless, the convenience of IoT also brings about higher risk for information security. Since IoT equipment cover a wide field of application, hackers may launch attack in many aspects, which is a tough challenge for security. Speaking of the information security of IoT in the past, most people may anticipate the encrypted connection in software and internet aspects. However, in addition to the safety protection in internet aspect, physical equipment in IoT also encounters the same threat. As long as counterfeit chips or other problem emerges, hacker may remotely control the equipment, acquire key or other sensitive information through internet, and in turn cause a loss for company. Therefore, software-based information security design is no longer sufficient to provide comprehensive security and safeguard in IoT field.

Accordingly, hardware security technology based on physically unclonable function (PUF) emerges, with principle of introducing various random variables in semiconductor process to create slight differences in microscopic structure of IC products. Under the circumstances that these kinds of random variables are unpredictable and uncontrollable, duplication of these chips is almost impossible, thereby reducing the risk of intentional reverse engineering and operation. The properties randomness, of uniqueness and nonreproducibility make PUF a kind of IC fingerprint presence, and therefore becomes a popular choice in the zero trust architecture of information security in new generation.

SUMMARY OF THE INVENTION

In the light of strong demand for hardware information security in current internet of things (IoT) technology, the present invention hereby provides a novel semiconductor structure, with feature of increasing read voltage range through resistance variation resulted from metal layers, vias and electrical connection therebetween in back-end-of-line (BEOL) process, thereby achieving the purpose of enhancing random code generation in physically unclonable function (PUF).

One aspect of the present invention is to provide an interconnect for physically unclonable function (PUF), including a PUF cell array, the PUF cell array is comprised of multiple arranged PUF cells, and each PUF cell includes at least two L-shaped metal lines overlapping each other in vertical direction, wherein each L-shaped metal line includes a first part extending in a first horizontal direction and a second part extending in a second horizontal direction with one end connecting with one end of the first part, the first horizontal direction is perpendicular to the second horizontal direction, and multiple dummy metal lines extending in the first horizontal direction, wherein each dummy metal line is adjacent to the first part of one L-shaped metal line in the second horizontal direction, and multiple vias extending in the vertical direction, wherein the first part of L-shaped metal line is electrically connected to adjacent second part of another L-shaped metal line through one via in the vertical direction.

Another aspect of the present invention is to provide a method of achieving physically unclonable function (PUF) through interconnects, including steps of providing a PUF cell array, the PUF cell array is comprised of multiple arranged PUF cells, and each PUF cell includes at least two L-shaped metal lines overlapping each other in vertical direction, wherein each L-shaped metal line includes a first part extending in a first horizontal direction and a second part extending in a second horizontal direction and with one end connecting to one end of the first part, the first horizontal direction is perpendicular to the second horizontal direction, and multiple dummy metal lines extending in the first horizontal direction, wherein each dummy metal line is adjacent to the first part of one L-shaped metal line in the second horizontal direction, and multiple vias extending in the vertical direction, wherein the first part of L-shaped metal line is electrically connected to adjacent second part of another L-shaped metal line through one via in the vertical direction, and applying a constant current to the PUF cell array, the constant current flows through every PUF cell and generate a voltage corresponding to the PUF cell, and determining a random code of the corresponding PUF cell as 0 if the voltage is less than a setting value, and determining a random code of the corresponding PUF cell as 1 if the voltage is greater than a setting value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates inherent random code fingerprints of multiple PUF chips in accordance with one embodiment of present invention.

Figure 1:
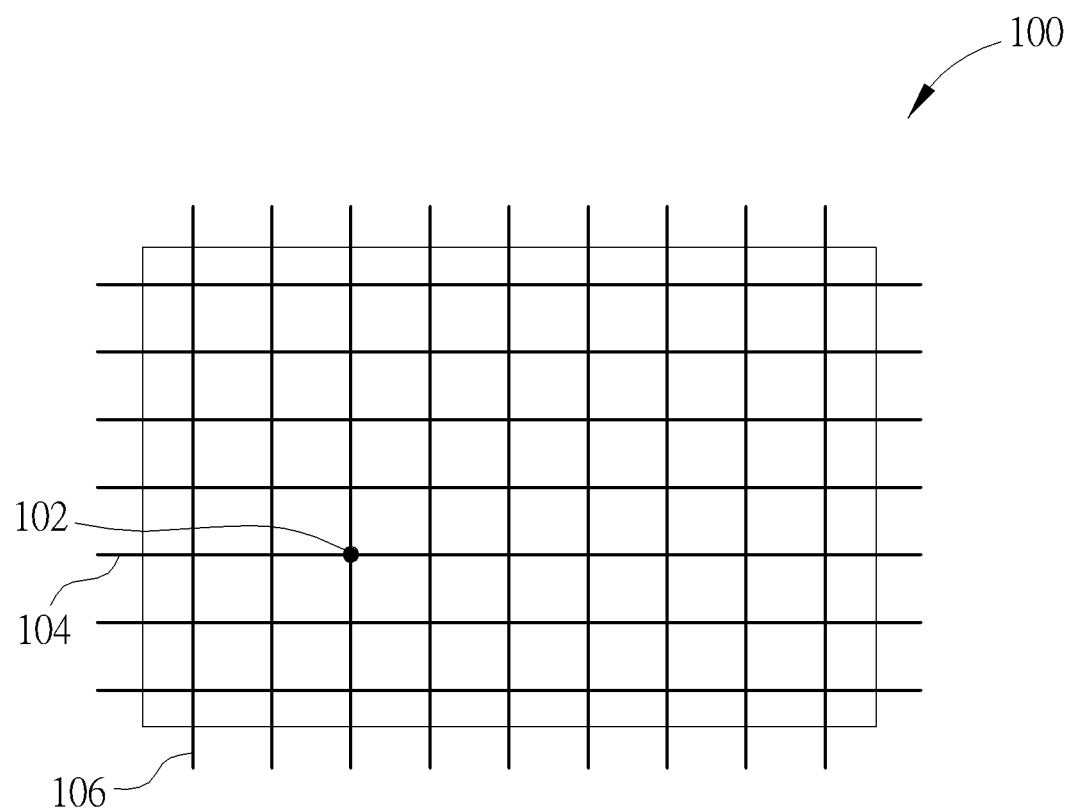
FIG. 1 is a schematic plan view of a physically unclonable function (PUF) cell array in accordance with one embodiment of present invention.

Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

Reference will now be made in detail to exemplary embodiments of the invention, which are illustrated in the accompanying drawings in order to understand and implement the present disclosure and to realize the technical effect. It can be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something). Further, spatially relative terms, such as "beneath," "below," "lower," "above," "upper," and the like, may be used herein for ease of description to describe one element or feature relationship to another element(s) or feature(s) as illustrated in the figures.

As used herein, the term "layer" refers to a material portion including a region with a thickness. A layer can extend over the entirety of an underlying or overlying structure, or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductor and contact layers (in which contacts, interconnect lines, and/or through holes are formed) and one or more dielectric layers.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. Additionally, the term "based on" may be understood as not necessarily intended to convey an exclusive set of factors, but may allow for the presence of other factors not necessarily expressly described, again depending at least in part on the context.

It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The interconnect and relevant embodiment provided by the present invention are used to achieve physically unclonable function (PUF) for identifying hardware equipment. This sort of structure may be designed in an application specific integrated circuit (ASIC) or field programmable gate array (FPGA), with principle of establishing challenge/response database when equipment or device is manufactured to identify the equipment without algorithm for authenticated encryption, thereby preventing the theft or tamper of equipment ID as well as waiving additional cost for injecting key to the equipment and preventing later risk of key lost and information security vulnerability.

Please refer to FIG. 1, which is a schematic plan view of a physically unclonable function (PUF) cell array in accordance with one embodiment of present invention. In general, the structure of present invention is a PUF cell array 100 comprised of multiple arranged PUF cells 102. Each PUF cell 102 is located at a node intersecting by an input line 104 and an output line 106 and may be connected with memory devices. In the application of preferred embodiment, current may be inputted to PUF cell array 100 through input line 104, flow through the connected PUF cells 102 and then be outputted through output line 106, so that specific voltage of every PUF cell 102 in the PUF cell array 100 may be obtained, and random code like 0 or 1 may be produced therefrom. Accordingly, the PUF cell array 100 comprised of multiple PUF cells 102 is provided with an innate, inherent electrical fingerprint, which may functions as a key for identifying chip or equipment.

Figure 2:
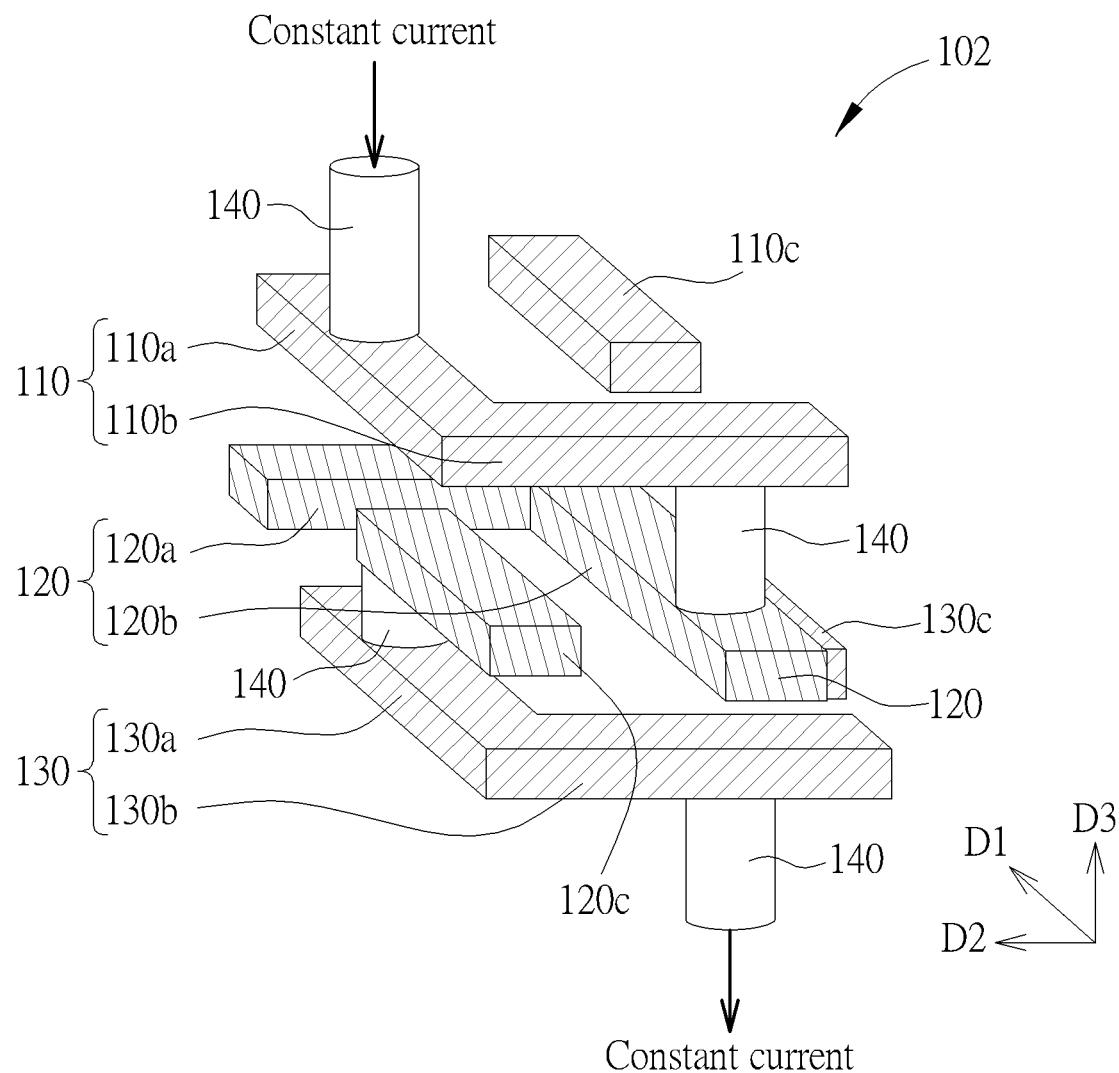
FIG. 2 is a schematic isometric view of a PUF cell in accordance with the preferred embodiment of present invention.

Please refer next to FIG. 2, which is a schematic isometric view of a PUF cell in accordance with the preferred embodiment of present invention. In the preferred embodiment of present invention, the PUF cell 102 is composed of interconnects (or may be referred as metal routing) formed in back-end-of-line (BEOL) process, ex. metal layers and vias. As shown in figure, each PUF cell 102 may include a plurality of L-shaped metal lines 110, 120, 130. Each L-shaped metal line 110, 120, 130 includes a first part 110a, 120a, 130a and a second part 110b, 120b, 130b, wherein the first part 110a, 120a, 130a extends in a first horizontal direction D1 and the second part 110b, 120b, 130b extends in a second horizontal direction D2, the first horizontal direction D1 is substantially perpendicular to the second horizontal direction D2, and the two parts are connected with each other at one end. In the preferred embodiment of present invention, each L-shaped metal line 110, 120, 130 is in a BEOL metal layer (ex. first metal layer M1 to top metal layer TM), and the L-shaped metal lines 110, 120, 130 are partly overlapped in vertical direction D3, and the vertical direction D3 is preferably perpendicular to the first horizontal direction D1 and the second horizontal direction D2. For example, the first part 120a of L-shaped metal line 120 overlaps adjacent second parts 110b, 130b of L-shaped metal line 110, 130 in the vertical direction D3, and the second part 120b of L-shaped metal line 120 overlaps adjacent first parts 110a, 130a of L-shaped metal line 110, 130 in the vertical direction D3, so that these parts may be electrically connected through via 140 therebetween.

Refer still to FIG. 2. In addition to L-shaped metal lines 110, 120, 130, each PUF cell 102 is further provided with a plurality of dummy metal lines 110c, 120c, 130c. Each dummy metal line 110c, 120c, 130c is adjacent to corresponding L-shaped metal lines 110, 120, 130 (i.e. the L-shaped metal line in the same metal layer). More specifically, as shown in the figure, in the preferred embodiment of present invention, the dummy metal line 110c, 120c, 130c extends in second horizontal direction D2 like the first part 110a, 120a, 130a of L-shaped metal lines 110, 120, 130, and the dummy metal line 110c, 120c, 130c is set in a position adjacent to the first part 110a, 120a, 130a and the second part 110b, 120b, 130b of corresponding L-shaped metal lines 110, 120, 130 without being connected therewith. Different from the L-shaped metal lines 110, 120, 130, the dummy metal line 110c, 120c, 130c is not connected with metal lines in other metal layers through any via.

Refer still to FIG. 2. In actual implementation, a constant current is inputted from the topmost via 140 of PUF cell 102, with its source may be a connected external circuit like the input line 104 in FIG. 1. The constant current will flow through a plurality of L-shaped metal lines 110, 120, 130 connected by vias 140 and is outputted to a connected external circuit like the output line 106 in FIG. 1, through bottommost via 140 of PUF cell. Since every PUF cell 102 is provided with respective L-shaped metal lines 110, 120, 130, vias 140 and different connection condition therebetween, so that total resistance of entire metal routing will be different, and the cell voltage of every PUF cell 102 measured under the constant current will also be different. In the embodiment of present invention, the cell voltage may be used to generate a PUF random code required in PUF application for identifying equipment ID. Please note that in the embodiment of present invention, the number of L-shaped metal lines and dummy metal lines is not limited to three sets as shown in FIG. 2, and the constant current is not limited to be applied only through the topmost via. Basically, at least two sets of L-shaped metal lines connected through vias 140 and dummy metal lines may fulfill the requirement to implement the present invention. In general, the more set the L-shaped metal lines and dummy metal lines, the more significant the PUF randomness, uniqueness and unpredictability may be achieved.

Figure 3:
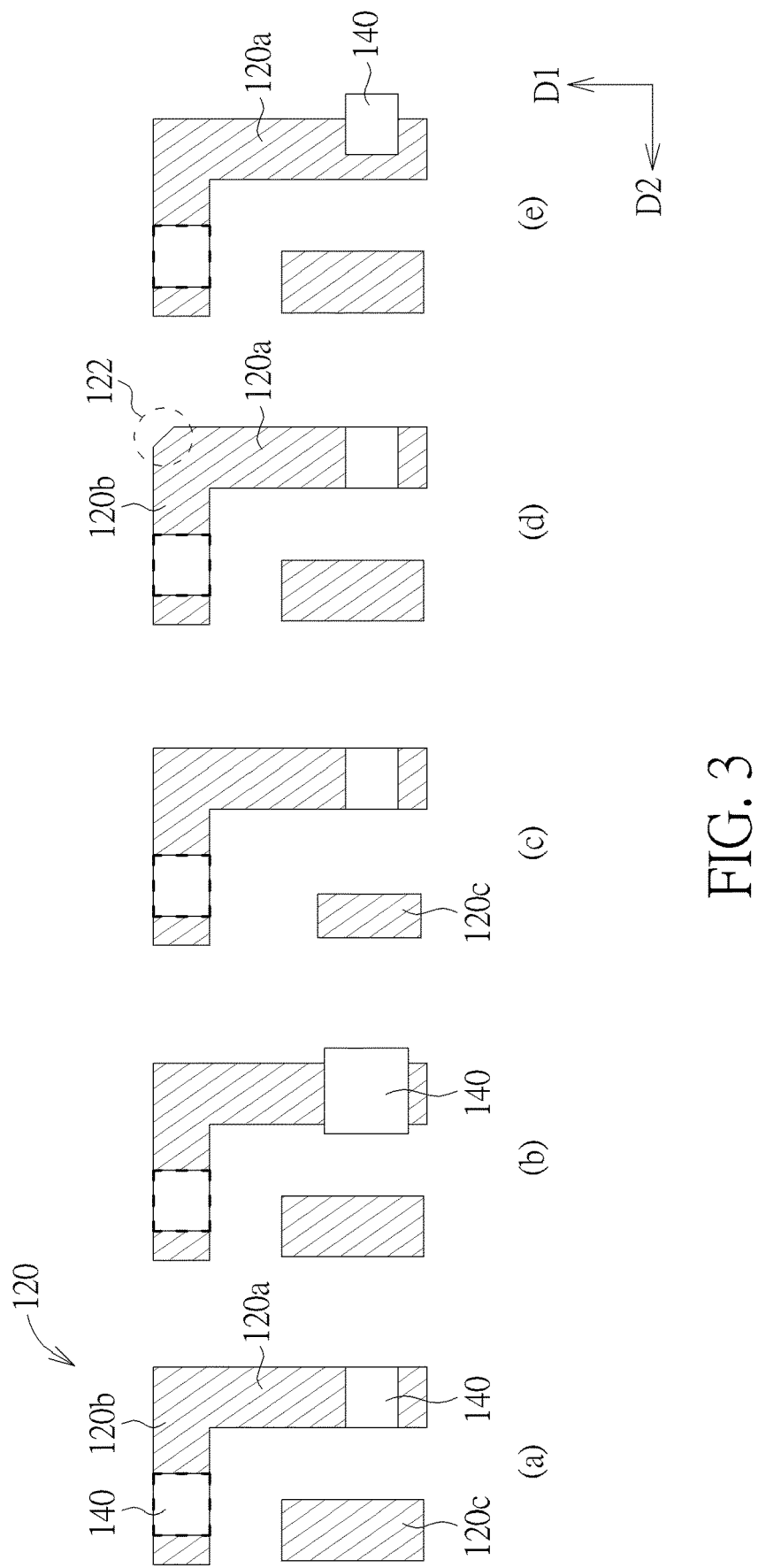
FIG. 3 illustrates various feature variations of metal layers, vias and electrical connections therebetween in back-end-of-line (BEOL) process in accordance with one embodiment of present invention.

Please refer now to FIG. 3, which illustrates various feature variations that may be created in BEOL interconnects in accordance with the aforementioned embodiment of present invention. These variations are all beneficial to the randomness of PUF chip coding. In ideal condition that no process variation occurs, as shown in case (a), the width of first part 120a, second part 120b of L-shaped metal line 120 and the dummy metal line 120c would be consistent, and the horizontal cross-sectional area of via 140 would also be consistent and precisely lands on the connected L-shaped metal line, i.e. the horizontal cross-section of via is completely connected with the L-shaped metal line. However, in actual process, the L-shaped metal line and dummy metal line 120c may not meet the ideal condition of case (a) due to process variation, and instead, they may be deviated from setting values in every aspect. For example, in case (b), the horizontal cross-section of via 140 may be too large or too small due to abnormal photolithography process, thereby impacting the contact resistance between via 140 and L-shaped metal line. In addition, in the condition of case (e), via 140 may not land on predetermined position on the L-shaped metal line due to overlay misalignment of current layer and previous layer, thereby significantly increasing contact resistance. In another aspect, in the embodiment of present invention, the presence of dummy metal line 120c also provides more variables for forming ideal PUF cell pattern. For example, as shown in case (c), abnormal photolithography process may cause the width or length of dummy metal line 120c pattern deviated from its setting value, thereby causing the abnormality of adjacent L-shaped metal line pattern due to micro loading effect and impacting its resistance. In addition, as shown in case (d), semiconductor circuit pattern formed in actual photolithography process may form rounding feature 122 easily at pattern corner. This sort of pattern feature resulted from process may also change the resistance of PUF cell.

Figure 4:
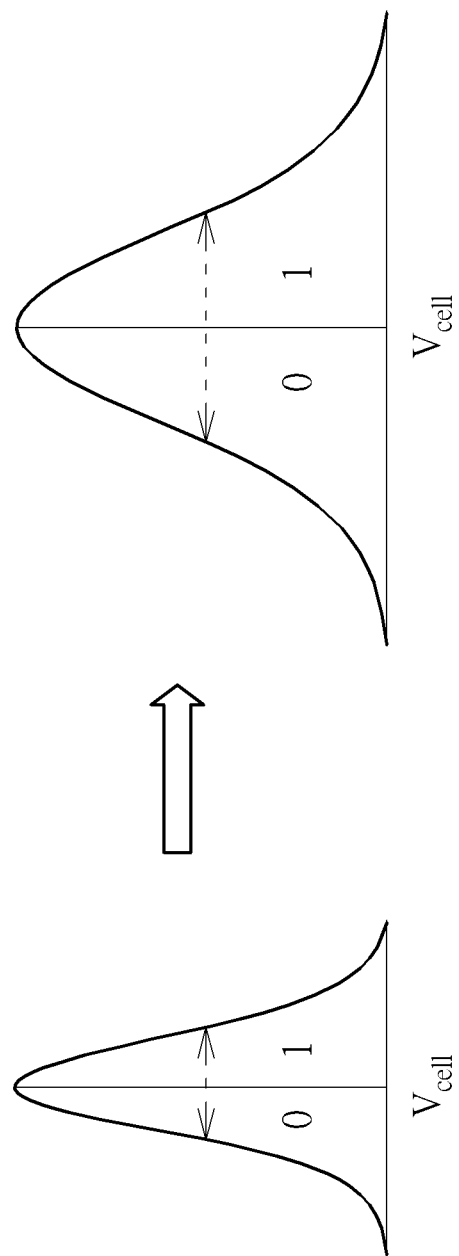
FIG. 4 is a schematic view showing the widen distribution of PUF cell voltage read in accordance with one embodiment of present invention.

Please refer now to FIG. 4, which is a schematic view showing widen cell voltage distribution of PUF cell in accordance with one embodiment of present invention. Under normal circumstances, as shown in left part of the figure, cell voltage $V_{cell}$ measured from normal PUF cell or structure will be in normal distribution due to process variation and will has a mean value. In the generation of PUF cell random code, the random code of PUF cell having cell voltage $V_{cell}$ less than average may be determined as 0, while the random code of PUF cell having cell voltage $V_{cell}$ greater than average may be determined as 1, so that the PUF cell array 100 composed of multiple PUF cells may produce an innate, inherent electrical fingerprint after its manufacture is completed. As shown in FIG. 5, multiple PUF cell arrays 100, 200, 300 are provided with respective electrical fingerprints composed of random codes 0 and 1.

Although PUF cells manufactured in the same process may have aforementioned randomness, since the target of semiconductor process always tends to achieve higher stability, uniformity and reduced variability, the range of normal distribution of cell voltage $V_{cell}$ in aforementioned FIG. 4 is not large normally, meaning the randomness of PUF cell is not large. In the present invention, based on the various abnormalities of metal circuit pattern designed specifically as shown in aforementioned FIG. 3, the cell voltage $V_{cell}$ variation measured from PUF cells after applying constant current is also increased. As the normal distribution shown in right part of FIG. 4, the range of normal distribution curve of cell voltage $V_{cell}$ is wider and has tailing feature. Accordingly, the window for generating and determining the logic level "0" and "1" of random code in PUF application becomes larger, therefore the PUF cells will be less susceptible to read error or distortion resulted from environment change (ex. different operating temperatures lead to the shift of cell voltage $V_{cell}$), enhancing the reliability and robustness of PUF cells, and the randomness and uniqueness of electrical fingerprint obtained from PUF cell array in the same process may also be increased.

Figure 6:
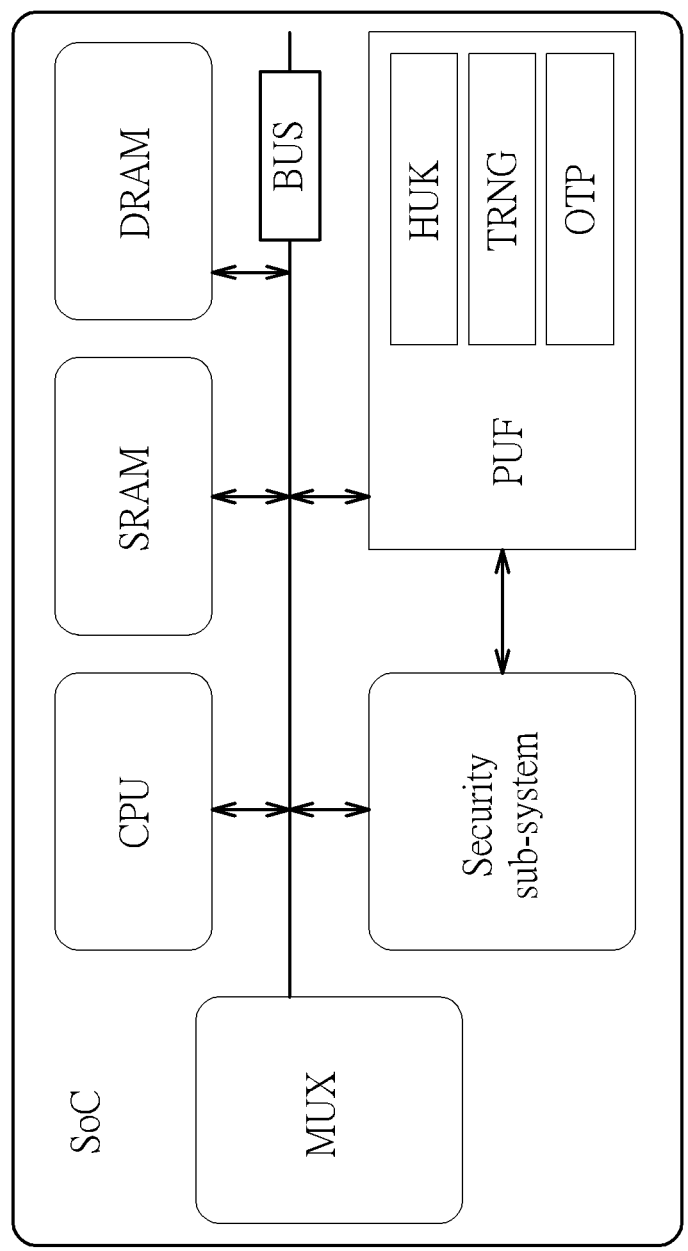
FIG. 6 is a block diagram of a system on a chip (SoC) with PUF block in accordance with one embodiment of present invention.

Please refer to FIG. 6, which is a function block diagram of a system-on-a-chip (SoC) with PUF function block in accordance with one embodiment of present invention. The aforementioned PUF cell array 100 of present invention may be used to manufacture the PUF function block in a SoC. As shown in FIG. 6, function blocks like data selector MUX, central processing unit CPU, static random access memory SRAM, dynamic random access memory DRAM, security sub-system and physically unclonable function block PUF may be integrated in the SoC and connected with each other through busbar BUS. The physically unclonable function block PUF may further include sub-blocks like hardware unique key HUK, true random number generator (TRNG) and one-time programmable memory OTP.

In PUF operation, input and output actions are performed by the physically unclonable function block PUF, wherein the input and output matching depend its PUF attributes. The input of PUF is usually referred as a challenge, while the output is referred as a response. Each set of input may find its similarity through mathematical formula. The purpose of PUF block is to give a challenge value for the same IC, and the acquired response value should be stable and reproducible. With respect to different ICs, response values are different and unique, wherein the hardware unique key HUK therein is the basis to protect every chip, and also a starting point of trust chain in whole system and relevant service, which creates a unique, innate and nonreproducible key. The one-time programmable memory OTP provides options for key storage through the method of anti-fuse memory, wherein conductive path is formed in the monocrystalline oxide layer through quantum tunneling principle, so that no trace may be observed on the surface, which grants them data invisibility. Data selector MUX may select one signal for outputting from multiple analog and digital input signals and be connected to the one-time programmable memory OTP for test actions through busbar BUS. The true random number generator TRNG is provided with digital simulation design, which combines static and dynamic entropies to generate random number through physical process rather than computer program. The physically unclonable function block PUF is connected with the security sub-system to provide safe storage s and high-quality entropies for the encryption function in the security sub-system.

In summary of the aforementioned embodiments, the present invention achieves the purpose of enhancing PUF random coding through specific pattern design of interconnects formed in BEOL process through currently available semiconductor process, which may significantly improve the randomness, uniqueness and robustness required by PUF chips, suitable for the internet of things (IoT) hardware security technology in the zero trust architecture of information security in new generation, which is an invention provided with novelty, non-obviousness and utility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interconnect for physically unclonable function (PUF), comprising a PUF cell array, said PUF cell array is comprised of multiple arranged PUF cells, and each said PUF cell comprises:
    at least two L-shaped metal lines overlapping each other in vertical direction, wherein each said L-shaped metal line comprises a first part extending in a first horizontal direction and a second part extending in a second horizontal direction with one end connecting with one end of said first part, said first horizontal direction is perpendicular to said second horizontal direction;
    multiple dummy metal lines extending in said first horizontal direction, wherein each said dummy metal line is adjacent to said first part of one said L-shaped metal line in said second horizontal direction; and
    multiple vias extending in said vertical direction, wherein said first part of said L-shaped metal line is electrically connected to adjacent said second part of another said L-shaped metal line through one said via in said vertical direction.

2. The interconnect for physically unclonable function (PUF) of claim 1, wherein said first part of said L-shaped metal line overlaps adjacent said second part of said another L-shaped metal line in said vertical direction, and said second part of said L-shaped metal line overlaps adjacent said first part of said another L-shaped metal line in said vertical direction.

3. The interconnect for physically unclonable function (PUF) of claim 1, wherein said dummy metal line overlaps adjacent said first part of said L-shaped metal line in said vertical direction.

4. The interconnect for physically unclonable function (PUF) of claim 1, wherein one constant current is inputted from topmost said via of said interconnect and outputted from bottommost said via of said interconnect.

5. The interconnect for physically unclonable function (PUF) of claim 4, wherein said constant current flows through every said PUF cell and generate a voltage corresponding to said PUF cell, and said voltage is used to determine a random code corresponding to said PUF cell.

6. The interconnect for physically unclonable function (PUF) of claim 1, wherein interconnect is a back-end-of-line (BEOL) interconnect.

7. A method of achieving physically unclonable function (PUF) through interconnects, comprising:
    providing a PUF cell array, said PUF cell array is comprised of multiple arranged PUF cells, and each said PUF cell comprises:
        at least two L-shaped metal lines overlapping each other in vertical direction, wherein each said L-shaped metal line comprises a first part extending in a first horizontal direction and a second part extending in a second horizontal direction and with one end connecting to one end of said first part, said first horizontal direction is perpendicular to said second horizontal direction;
        multiple dummy metal lines extending in said first horizontal direction, wherein each said dummy metal line is adjacent to said first part of one said L-shaped metal line in said second horizontal direction; and
        multiple vias extending in said vertical direction, wherein said first part of said L-shaped metal line is electrically connected to adjacent said second part of another said L-shaped metal line through one said via in said vertical direction;
    applying a constant current to said PUF cell array, said constant current flows through every said PUF cell and generate a voltage corresponding to said PUF cell; and
    determining a random code of said corresponding PUF cell as 0 if said voltage is less than a setting value, and determining a random code of said corresponding PUF cell as 1 if said voltage is greater than a setting value.

8. The method of achieving physically unclonable function (PUF) through interconnects of claim 7, wherein a variation of landing position of said via on said L-shaped metal line changes a resistance of said corresponding PUF cell, thereby changing said generated voltage.

9. The method of achieving physically unclonable function (PUF) through interconnects of claim 7, wherein a variation of horizontal cross-sectional area of said via changes a resistance of said corresponding PUF cell, thereby changing said generated voltage.

10. The method of achieving physically unclonable function (PUF) through interconnects of claim 7, wherein a variation of horizontal area of said dummy metal line causes a pattern variation of adjacent said first part, thereby changing a resistance of said corresponding PUF cell and further changing said generated voltage.

11. The method of achieving physically unclonable function (PUF) through interconnects of claim 7, wherein a variation of horizontal area of said dummy metal line causes a pattern variation of adjacent said second part, thereby changing a resistance of said corresponding PUF cell and further changing said generated voltage.

12. The method of achieving physically unclonable function (PUF) through interconnects of claim 7, wherein a corner of said L-shaped metal line is provided with rounding feature, said rounding feature changes a resistance of said corresponding PUF cell and further changing said generated voltage.

* * * * *